(12) United States Patent
Yoon et al.

(10) Patent No.: US 9,793,063 B2
(45) Date of Patent: Oct. 17, 2017

(54) HIGH-CAPACITY SLURRY ELECTRODE AND FLOW ENERGY STORAGE SYSTEM BASED ON SAME

(71) Applicant: KOREA INSTITUTE OF ENERGY RESEARCH, Daejeon (KR)

(72) Inventors: Hana Yoon, Daejeon (KR); Jung Joon Yoo, Daejeon (KR)

(73) Assignee: KOREA INSTITUTE OF ENERGY RESEARCH, Daejeon (KR)

(*) Notice: Subject to any disclaimer, the term of this patent is extended or adjusted under 35 U.S.C. 154(b) by 146 days.

(21) Appl. No.: 14/871,506

(22) Filed: Sep. 30, 2015

(65) Prior Publication Data

US 2016/0093449 A1 Mar. 31, 2016

(30) Foreign Application Priority Data

Sep. 30, 2014 (KR) .................. 10-2014-0131412

(51) Int. Cl.
| | |
|---|---|
| *H01G 11/30* | (2013.01) |
| *H01G 11/00* | (2013.01) |
| *H01G 11/24* | (2013.01) |
| *H01G 11/44* | (2013.01) |
| *H01G 11/02* | (2013.01) |
| *H01G 11/32* | (2013.01) |
| *H01G 11/58* | (2013.01) |
| *H01G 11/34* | (2013.01) |
| *H01G 11/62* | (2013.01) |

(52) U.S. Cl.
CPC ............ *H01G 11/24* (2013.01); *H01G 11/02* (2013.01); *H01G 11/32* (2013.01); *H01G 11/44* (2013.01); *H01G 11/58* (2013.01); *H01G 11/34* (2013.01); *H01G 11/62* (2013.01); *Y02E 60/13* (2013.01)

(58) Field of Classification Search
CPC ................................ H01G 11/30; H01G 11/00
USPC .......................................................... 361/502
See application file for complete search history.

(56) References Cited

U.S. PATENT DOCUMENTS

2014/0042989 A1* 2/2014 Gogotsi ................ H01G 11/32
320/167

OTHER PUBLICATIONS

Campos, "Investigation of Electrode Materials for an Electrochemical Flow Capacitor," Thesis submitted to the faculty of Drexel University in partial fulfillment of the requirements for the degree of Master of Science in Chemical Engineering, Dec. 2012, 60 pages.
Campos et al., "Investigation of carbon materials for use as a flowable electrode in electrochemical flow capacitors," Electrochimica Acta 98:123-130, 2013.

(Continued)

*Primary Examiner* — Eric Thomas
(74) *Attorney, Agent, or Firm* — Seed IP Law Group LLP

(57) ABSTRACT

Disclosed herein is a high-capacity slurry electrode for use in a flow energy storage system, comprising: an electrolyte; electrode active particles, distributed in the electrolyte, functioning as an electrode active material in an electrochemical flow capacitor storage system; and a redox active material, dissolved in the electrolyte, behaving as a pseudo-capacitor through a redox reaction on a surface of the electrode active material, wherein the high-capacity slurry electrode exhibits both capacitor properties based on the electrode active particles and pseudo-capacitor properties based on the redox active material.

16 Claims, 20 Drawing Sheets

(56) References Cited

OTHER PUBLICATIONS

Guin et al., "Electrochemical Reduction of Quinones in Different Media: A Review," *SAGE-Hindawi Access to Research, International Journal of Electrochemistry* vol. 2011, Article ID 816202, 2011, 23 pages.
Hatzell et al., "*A High Performance Pseudocapacitive Suspension Electrode for the Electrochemical Flow Capacitor,*" Electrochimica Acta 111:888-897, 2013.
Presser et al., "The Electrochemical Flow Capacitor: A New Concept for Rapid Energy Storage and Recovery," *Adv. Energy Mater.* 2012, 2, 895-902.
Senthilkumar et al., "Electric Double Layer Capacitor and its Improved Specific Capacitance Using Redox Additive Electrolyte," *J. Mater. Chem. A*, 2013, 1, 1086-1095.

\* cited by examiner

HIGH-CAPACITY SLURRY ELECTRODE AND FLOW ENERGY STORAGE SYSTEM BASED ON SAME

The entire contents of Korean Patent Application No. 10-2014-0131412, filed on Sep. 30, 2014 in the Korean Intellectual Property Office, are incorporated herein by reference.

BACKGROUND OF THE INVENTION

1. Field of the Invention

The present invention relates to a slurry electrode for use in flow energy storage systems, and a high-capacity slurry electrode-based flow energy storage system. More particularly, the present invention relates to a slurry electrode greatly improved in capacity, and a flow energy storage system based on the same.

2. Description of the Related Art

Recently, the demand and supply of energy is apt to be unstable because the prices of fossil fuels, such as petroleum, coal, etc., which are the main raw materials for electric power production, erratically change, and also because the rate of exchange frequently changes. In addition, high oil prices, and entry into the age of forced reduction of greenhouse gas emissions have increased the price of electric power production. For these reasons, there is a need for a national energy management system. The greenhouse gas that is emitted with the use of conventional energy sources, such as fossil fuels, is found to serve as a main factor of ecocide and environmental pollution. New renewable energy, such as wind force, solar energy, tidal force, etc, have attracted intensive attention as an alternative for solving the problems with conventional energy sources. Highly sensitive to weather conditions, however, electric power production from new renewable energy is impossible to maintain at constant and uniform levels. Due to this disadvantage, new renewable energy cannot be directly applied to existing electrical grid systems. For overcoming the problem, a medium-to-large capacity energy storage system is required. Medium-to-large capacity secondary cells find applications in various fields including the storage of new renewable energy, green cars, green homes, etc.

For medium-to-large capacity secondary cells, price and stability are very important factors. Lithium ion cells are very difficult to develop into MWh-level energy storage systems for power plants and distributed generation because of process difficulty in stably achieving a large area/high capacitance, cost, etc. Particularly, one of the main difficulties in implementing a smart grid for spreading new renewable energy is to alternate energy sources in real time in response to a rapid change in electric power production from new renewable energy, without reducing quality of electric power. Exhibiting limited charge/discharge rates in addition to being low in capacity for holding a charge after a single charging session, currently used secondary cells have high difficulty in receiving peak power.

Recently, Professor Gogotsi and his research team at Drexel University, USA have reported a new energy storage system, called electrochemical flow capacitor (EFC). As an electric double-layer capacitor (EDLC), the electrochemical flow capacitor is expected to achieve a higher energy density, compared to conventional solid electrode-type super capacitors, because it is found to increase the capacitance of storage tanks employing flow electrodes in a slurry state (slurry electrodes) while retaining the advantages of super capacitors including high output, longevity and stability. However, the capacitance limit of the slurry electrode is a barrier to increasing energy densities to that of lithium secondary cells.

SUMMARY OF THE INVENTION

Accordingly, the present invention has been made keeping in mind the above problems occurring in the prior art, and an object of the present invention is to provide a novel energy storage system that retains both the advantages of secondary cells, such as a high energy density, and the advantages of super capacitors, such as high charge/discharge rates, peak power acceptance, stability, longevity, etc.

In order to accomplish the above object, the present invention provides a high-capacity slurry electrode for use in a flow energy storage system, comprising: an electrolyte; electrode active particles, distributed in the electrolyte, functioning as an electrode active material in an electrochemical flow capacitor storage system; and a redox active material, dissolved in the electrolyte, behaving as a pseudo-capacitor through a redox reaction on a surface of the electrode active material, wherein the high-capacity slurry electrode exhibits both capacitor properties based on the electrode active particles and pseudo-capacitor properties based on the redox active material.

In one exemplary embodiment of the present invention, the electrode active particles are made of a material selected from among active carbon, graphene, a carbon nanotube, a conductive polymer, a metal oxide, and a combination thereof.

In another exemplary embodiment of the present invention, the electrode active particles are spherical or symmetric with a specific surface area of 1000~4000 $m^2/g$.

In another exemplary embodiment of the present invention, the electrode active particles have a particle size of 500 nm~500 μm.

In another exemplary embodiment of the present invention, the redox active material is a reduced form, an oxidized form, or a derived form of an electrochemically active organic molecule based on a benzene compound having either or both of an alcohol and an amine group.

In another exemplary embodiment of the present invention, the redox active material is a reduced form, an oxidized form, or a derived form of an electrochemically active organic molecule based on a naphthalene or anthracene compound having either or both of an alcohol and an amine group.

In another exemplary embodiment of the present invention, the redox active material is an electrochemically active inorganic molecule selected from among KI and KBr.

In another exemplary embodiment of the present invention, the redox active material is dissolved at a concentration of $10^{-9}$ M~10 M in the electrolyte.

In another exemplary embodiment of the present invention, the redox active material is 1,4-benzenediol or benzoquinone and is dissolved at a concentration of $10^{-9}$ M~5 M in the electrolyte.

In another exemplary embodiment of the present invention, the redox active material is 1,4-naphthoquinone and is dissolved at a concentration of $10^{-9}$ M~5 M in the electrolyte.

In another exemplary embodiment of the present invention, the high-capacity slurry electrode may further comprise conductive agent particles dispersed in the electrolyte, the conductive agent particles being used in an amount of 50 wt % or less of the electrode active particles.

In another exemplary embodiment of the present invention, wherein the conductive agent is carbon black.

In accordance with another aspect thereof, the present invention provides a method for preparing a high-capacity slurry electrode, comprising: dissolving a redox active material in an electrolyte to give a redox active electrolyte, the redox active material being electrochemically active so as to perform a redox reaction; and mixing electrode active particles with the redox active electrolyte, the electrode active particles functioning as an active material in an electrochemical flow capacitor storage system.

In an exemplary embodiment of the present invention, the electrolyte is an aqueous electrolyte containing at least one selected from among sulfuric acid ($H_2SO_4$), sodium sulfate ($Na_2SO_4$), potassium chloride (KCl), potassium hydroxide (KOH), and sodium hydroxide (NaOH).

In another exemplary embodiment of the present invention, the electrolyte is a mixture of an organic solvent selected from the group consisting of acetonitrile (ACN), propylene carbonate (PC), ethylene carbonate (EC), diethylene carbonate (DEC), dimethylene carbonate (DMC), and a combination thereof, and a salt selected from among an ammonium salt, a lithium salt, and a combination thereof.

In another exemplary embodiment of the present invention, the electrode active particles are blended with the conducting agent particles to give a mixture powder, and the mixture powder is mixed at a weight ratio of 1:1~1:20 with the redox active electrolyte.

In accordance with a further aspect thereof, the present invention provides a high-capacity slurry electrode-based flow energy storage system, comprising: an anode current collector and a cathode current collector, separated from each other; an ion permeable separation membrane disposed between the anode current collector and the cathode current collector; a fluid anode positioned at an electrode region between the anode current collector and the ion permeable separation membrane; and a fluid cathode positioned at an electrode region between the cathode current collector and the ion permeable separation membrane, wherein at least one of the anode and the cathode is the high-capacity slurry electrode, exhibiting both a capacitor property based on the electrode active particles contained in the high-capacity slurry electrode and a pseudocapacitor property based on the redox active material contained in the high-capacity slurry electrode.

In another exemplary embodiment of the present invention, the high-capacity slurry electrode-based flow energy storage system may further comprise: storage tanks for storing the fluid anode and the fluid cathode, respectively; a path through which the fluid anode and the fluid cathode are circulated between the respective storage tanks and the electrode region; and a pump for driving the circulation.

In another exemplary embodiment of the present invention, the high-capacity slurry electrode-based flow energy storage system may further comprise a gasket, positioned between the anode current collector or the cathode current collector and the ion permeable separation membrane, for forming an electrode region.

In another exemplary embodiment of the present invention, the gasket is made of a material selected from among silicon rubber, fluororubber, butyl rubber, Teflon, neoprene, latex, chlorosulfonated polyethylene rubber, ethylene propylene rubber, styrenebutadiene rubber, butadiene rubber, and nitrile butadiene rubber.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
FIG. 1 is a SEM (Scanning Electron Microscopy, Hitachi S-4800) image of the spherical active carbon AC8K30 used in Example 1.

In accordance with an aspect thereof, the present invention addresses a high-capacity slurry electrode, which is used in a flow energy storage system, comprises: an electrolyte; electrode active particles, distributed in the electrolyte, functioning as an electrode active material in an electrochemical flow capacitor storage system; and a redox active material, dissolved in the electrolyte, behaving as a pseudo-capacitor through a redox reaction on a surface of the electrode active material, wherein the high-capacity slurry electrode exhibits capacitor properties based on the electrode active particles and pseudo-capacitor properties based on the redox active material. In this regard, the surface of the electrode active material means the entire surface of the active material. For example, when the electrode active material is porous, its surface includes entire surfaces of the pores into which the electrolyte can penetrate.

A slurry, which is in a semi-solid form with fluidity, refers to a mixture of a liquid phase and a solid phase, such as a particle suspension or a colloidal suspension. The slurry electrode having the above composition exhibits capacitor properties based on the electrode active particles and pseudo-capacitor properties based on the redox active material, thus elevating the capacity to the level of a second cell while retaining advantages of conventional super capacitors.

So long as it is typically used for super capacitors, any electrode active material, for example, active carbon, graphene, carbon nanotubes, conductive polymers, metal oxides, etc., may be employed as a material of the electrode active particle of the present invention. Since the slurry electrode of the present invention is a semi-solid state, electric contacts between the current collector and the electrode and between the electrode active materials themselves are very important. In addition, an electrode active region is not localized, but covers the entire surface of the electrode active material. Hence, a spherical or symmetrical electrode active material with a specific surface area of as high as 1000~4000 $m^2/g$ is preferred. Further, the electrode active particles may range in diameter from tens of nm to hundreds of μm. However, since active particles with a size of 100 nm or less are apt to increase resistance and viscosity through the formation of complex networks in the slurry electrode, the active material preferably has a particle size of 500 nm to 500 μm so as to provide suitable fluidity and to maintain continuous networks in the slurry electrode.

The redox active material may be a benzene compound having either or both of an alcohol and an amine group, and may be in a reduced form, such as hydroquinone, aminophenol, and diaminobenzene, or in an oxidized form thereof, such as benzoquinone and quinoneimine. Derivatives of these compounds may be used as the redox active material. Alternatively, the redox active material may be a naphthalene or anthracene compound having either or both of an alcohol and an amine group, and may be in a reduced form such as dihydroxynaphthalene, aminonaphthol, diaminonaphthalene, dihydroxyanthracene, and diaminoanthraquinone, or in an oxidized form thereof. Likewise, derivatives of the compounds are also useful as the redox active material. In addition to the electrochemical active organic molecules, inorganic molecules such as KI, KBr, etc. can be used to prepare a high-capacity slurry electrode thanks to their high electrochemical equivalents based on many-electron reactions.

Preferably, the redox active material is dissolved at a concentration of $10^{-9}$ M~10 M and more preferably at a concentration of $10^{-8}$ M~5 M in the electrolyte. The concentration may vary depending on the kind of the redox active material. As for 1,4-benzenediol and 1,4-benzoquinone, their concentration may range from $10^{-9}$ M to 5 M in the electrolyte, and preferably from 0.01 M to 3 M. 1,4-Naphthoquinone is preferably dissolved at a concentration of $10^{-9}$ M~5 M in the electrolyte.

In addition, the high-capacity slurry electrode may further comprise electroconducting agent particles dispersed in the electrolyte. Carbon black is useful as the electroconducting agent particles. The electroconducting agent particles may be used in an amount of 0 wt %~50 wt %, based on the total weight of the electrode active particles, and preferably in an amount of 5 wt %~30 wt %.

In accordance with another aspect thereof, the present invention addresses a method for preparing a high-capacity slurry electrode, comprising dissolving a redox active material in an electrolyte to give a redox active electrolyte, the redox active material being electrochemically active so as to perform a redox reaction; and mixing electrode active particles with the redox active electrolyte, the electrode active particles functioning as an active material in an electrochemical flow capacitor storage system.

Any of aqueous, organic, and ionic liquid electrolytes is available in the present invention, and selection may be made of an electrolyte that is effective for dissolving the redox active material used. Examples of the aqueous electrolyte include sulfuric acid ($H_2SO_4$), sodium sulfate ($Na_2SO_4$), potassium chloride (KCl), potassium hydroxide (KOH), sodium hydroxide (NaOH), and a combination thereof. The organic electrolyte may be a mixture of an organic solvent selected from the group consisting of acetonitrile (ACN), propylene carbonate (PC), ethylene carbonate (EC), diethylene carbonate (DEC), dimethylene carbonate (DMC), and a combination thereof, and a salt selected from among an ammonium salt such as tetraethylammonium tetrafluorborate ($TEABF_4$), triethylmethylammonium tetrafluorborate ($TEMABF_4$), etc., a lithium salt such as $LiBF_4$, $LiPF_6$, etc., and a combination thereof. The ionic liquid electrolyte is selected from the group consisting of 1-ethyl-3-methylimidazolium tetrafluoroborate ($EMIBF_4$), 1-n-butyl-3-methylimidazolium tetrafluoroborate ($BMIBF_4$), 1-ethyl-3-methylimidazolium bis-(trifluoromethylsulfonyl)imide (EMITFSI), 1-n-butyl-3-methylimidazolium hexafluorophosphate ($BMIPF_6$), 1-butyl-1-methylpyrrolidinium bis(trifluoromethanesulfonyl)imide ($PYR_{14}TFSI$), N-methoxyethyl-N-methylpyrrolidinium bis-(trifluoromethanesulfonyl)imide (PYR1(201)TFSI), 1-ethyl-3-methylimidazolium trifluoromethanesulfonate (EMITMS), 1-butyl-1-methylpyrrolidinium bis(trifluoromethylsulfonyl)imide (BMP-BTI), 1-hexyl-3-methylimidazolium hexafluorophosphate (HMIHFP), 1-ethyl-3-methylimidazolium dicyanamide (EMIDCA), 11-methyl-3-octylimidazolium tetrafluoroborate (MOITFB), N-methyl-N-propylpiperidinium bis(fluorosulfonyl)imide ($PIP_{13}FSI$), and N-butyl-N-methylpyrrolidinium bis(fluorosulfonyl)imide) ($PYR_{14}FSI$), and a combination thereof. Further, the ionic electrolyte may be used in mixture with an organic solvent selected from the group consisting of acetonitrile (ACN), propylene carbonate (PC), ethylene carbonate (EC), diethylene carbonate (DEC), dimethylene carbonate (DMC), and a combination thereof.

Together with the electroconducting agent particles, the electrode active particles may be blended using a mortar, and then mixed with the redox active electrolyte. In this regard, the mixture powder of the active particles and the electroconducting agent particles may be mixed at a weight ratio of 1:1~1:20 with the redox active electrolyte.

In another aspect thereof, the present invention addresses a high-capacity slurry electrode-based flow energy storage system, comprising an anode current collector and a cathode current collector, separated from each other; an ion permeable separation membrane disposed between the anode current collector and the cathode current collector; a fluid anode positioned at an electrode region between the anode current collector and the ion permeable separation membrane; and a fluid cathode positioned at an electrode region between the cathode current collector and the ion permeable separation membrane, wherein at least one of the anode and the cathode is the high-capacity slurry electrode, exhibiting both a capacitor property based on the electrode active particles contained in the high-capacity slurry electrode and a pseudocapacitor property based on the redox active material contained in the high-capacity slurry electrode, whereby the flow energy storage system is greatly improved in capacitance while retaining advantages of the capacitor.

In the high-capacity slurry electrode-based flow energy storage system, the electrode active region is not localized, but covers the entire surface of the electrode active material. The slurry electrode has an electric path through a continuous network formed therein, and is in an electrical contact with at least a portion of the current collector.

In addition, the high-capacity slurry electrode-based flow energy storage system of the present invention may comprise storage tanks for storing the fluid anode and the fluid cathode, respectively, a path through which the fluid anode and the fluid cathode are circulated between the respective storage tanks and the electrode region, and a pump for driving the circulation. The fluidity directions of the anode slurry electrode and the cathode slurry electrode may be alternately changed according to charge and discharge operations. The slurry electrodes may migrate independently in a continuous or intermittent manner. The fluid slurry electrodes are stored in respective storage tanks before use, and are continuously regenerated from the storage tanks to maintain the high energy capacitance of the energy storage system. From the storage tank, the slurry electrode may be delivered to an electrode cell with the aid of a pump or any typical means for fluid transport, including gravity. The storage tank in which the cathode or anode slurry electrode, after being completely charged, is stored can be detached from the cell hardware, so that the completely charged electrodes can be separately stored in a storage box. As needed, the completely charged slurry electrode may be withdrawn from the storage box, mounted on the cell, and allowed to release its energy through discharge. The current collector is inert to the electrolyte and has high conductivity. For example, the current collector may be made of a conductive carbonaceous material or an unreactive metal, such as Ti or SUS.

The high-capacity slurry electrode-based flow energy storage system of the present invention may further comprise a gasket, positioned between the anode current collector or the cathode current collector and the ion permeable separation membrane, for forming an electrode region. A material for the gasket is dependent on properties of the electrolyte used. Particularly, the gasket may be made of a durable, chemical-resistant material, such as fluororubber, butyl rubber, Teflon, neoprene, latex, chlorosulfonated polyethylene rubber, ethylene propylene rubber, styrenebutadiene rubber, butadiene rubber, and nitrile butadiene rubber.

Reference now should be made to the drawings, in which the same reference numerals are used throughout the different drawings to designate the same or similar components.

A better understanding of the present invention may be obtained through the following examples which are set forth to illustrate, but are not to be construed as the limit of the present invention.

Preparation of Slurry Electrode

Example 1

A high-capacity slurry electrode was prepared by mixing spherical active carbon (AC8K30) particles, which would function as an electrode active material in an electrochemical flow capacitor storage system, with a redox active electrolyte containing the electrochemically active organic molecule 1,4-benzenediol (hydroquinone, HQ).

Figure 2:
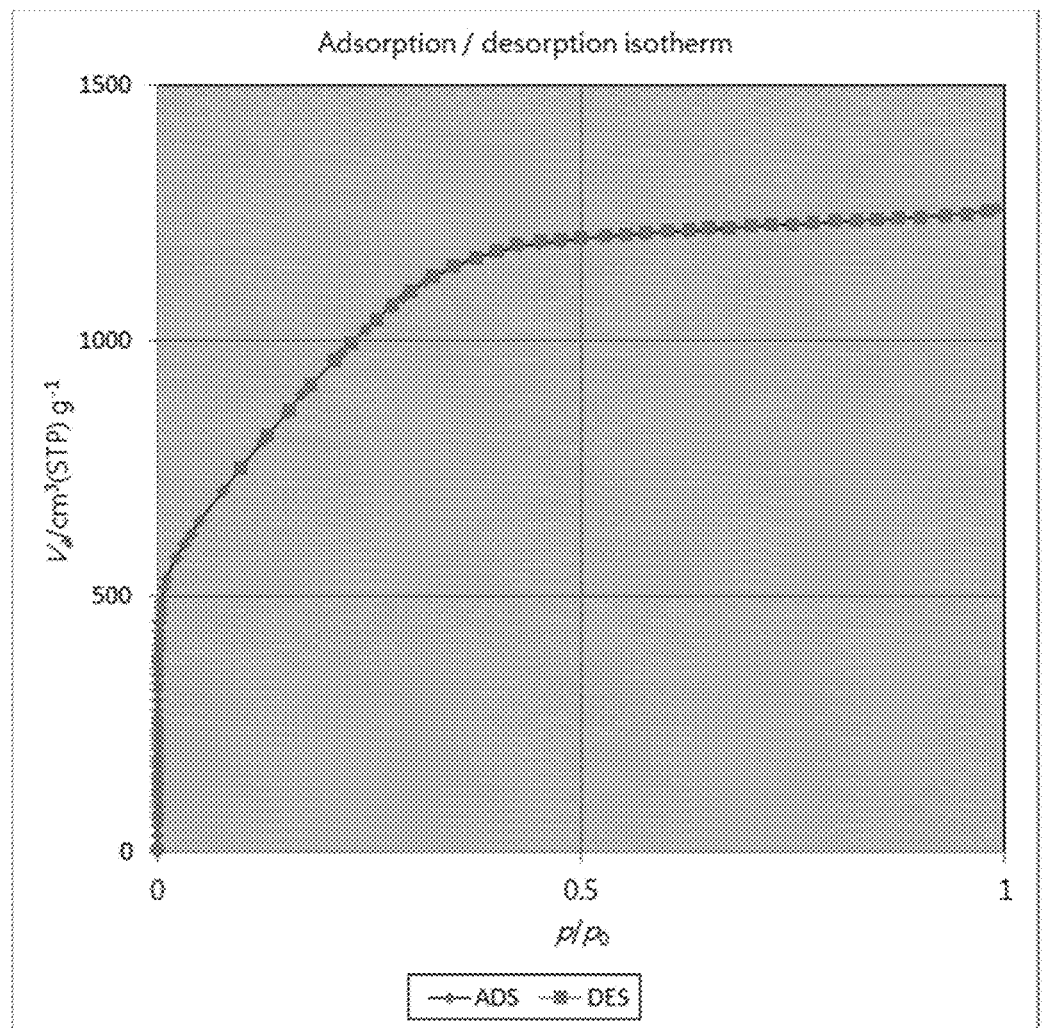
FIG. 2 is a nitrogen gas adsorption isotherm of the spherical active carbon of FIG. 1.

FIG. 1 is a SEM (Scanning Electron Microscopy, Hitachi S-4800) image of the spherical active carbon AC8K30 used in Example 1, and FIG. 2 is a nitrogen gas adsorption isotherm of the spherical active carbon of FIG. 1.

The nitrogen gas adsorption/desorption isotherm plot was obtained in liquid nitrogen (77K) using BELSORP-max. As analyzed by BET (Brunauer-Emmett-Teller), the spherical active carbon AC8K30 was observed to have a specific surface area of 3634.2 $m^2/g$ and a total pore volume of 1.9479 $m/g$ with a pore average diameter of 2.144 nm.

Briefly, the spherical active carbon AC8K30 as an electrode active material was mixed at weight ratio of 80 wt % to 20 wt % with the electroconducting agent carbon black and the mixture was ground in a mortar. Separately, 0.3 M of electrochemically active 1,4-benzenediol was dissolved in a 1 M $H_2SO_4$ electrolyte to give a redox active electrolyte. The mixture powder of the electrode active material and the electroconducting agent was blended at a weight ratio of 1:6 with the redox active electrolyte to prepare a high-capacity slurry electrode.

Example 2

A high-capacity slurry electrode was prepared by mixing spherical active carbon (AC8K30) of Example 1 with a redox active electrolyte containing the electrochemically active organic molecule 1,4-naphtoquinone (NQ).

Briefly, the spherical active carbon AC8K30 as an electrode active material was mixed at weight ratio of 80 wt % to 20 wt % with the electroconducting agent carbon black and the mixture was ground in a mortar. Separately, $10^{-6}$ M of 1,4-naphthoquinone was dissolved in a 1 M $H_2SO_4$ electrolyte to give a redox active electrolyte. The mixture powder of the electrode active material and the electroconducting agent was blended at a weight ratio of 1:6 with the redox active electrolyte to prepare a high-capacity slurry electrode.

Example 3

A high-capacity slurry electrode was prepared by mixing spherical active carbon (AC8K30) of Example 1 with a redox active electrolyte containing the electrochemically active inorganic molecule KI.

Briefly, the spherical active carbon AC8K30 as an electrode active material was mixed at weight ratio of 80 wt % to 20 wt % with the electroconducting agent carbon black and the mixture was ground in a mortar. Separately, $2\times10^{-4}$ M of KI was dissolved in a 1 M $H_2SO_4$ electrolyte to give a redox active electrolyte. The mixture powder of the electrode active material and the electroconducting agent was blended at a weight ratio of 1:6 with the redox active electrolyte to prepare a high-capacity slurry electrode.

Example 4

A high-capacity slurry electrode was prepared by mixing anisotropic active carbon (MSP20) and graphene nanopowder, both functioning as an electrode active material in an electrochemical flow capacitor storage system, with a redox active electrolyte containing the electrochemically active organic molecule 1,4-benzenediol.

Figure 3:
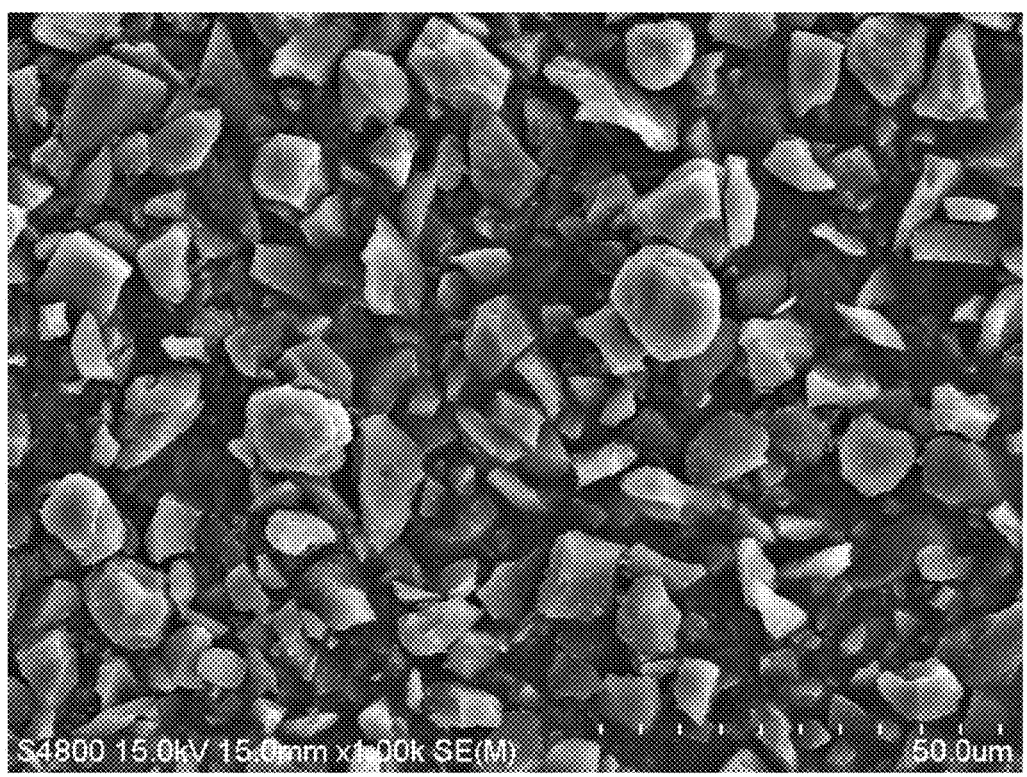
FIG. 3 is an SEM image of the anisotropic activated carbon MSP20 used in Example 4.
Figure 4:
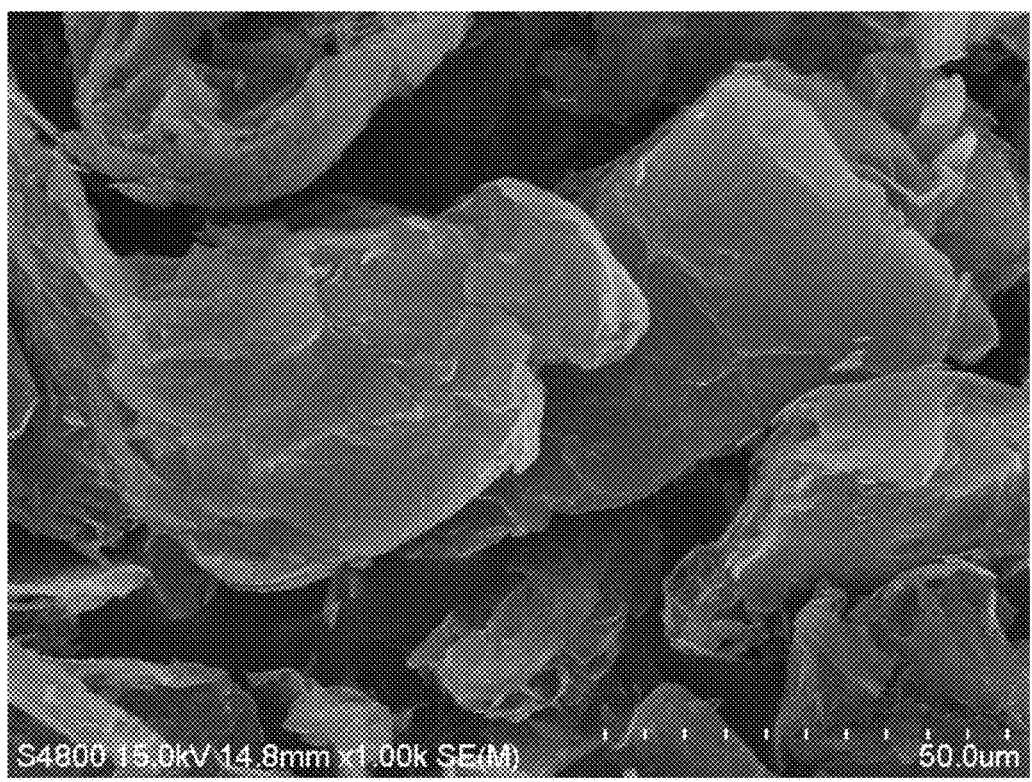
FIG. 4 is an SEM image of the graphene nanopowder, used in Example 4.

FIGS. 3 and 4 are SEM (Scanning Electron Microscopy, Hitachi S-4800) images of the anisotropic activated carbon MSP20 and the graphene nanopowder, used in Example 4, respectively.

Briefly, the anisotropic activated carbon MSP20 and graphene nanopowder, both used as an electrode active material, were mixed at weight ratio of 60 wt % to 40 wt %, and the mixture was ground in a mortar. Separately, 0.3 M of electrochemically active 1,4-benzenediol was dissolved in a 1 M H$_2$SO$_4$ electrolyte to give a redox active electrolyte. The mixture powder of the electrode active material and the electroconducting agent was blended at a weight ratio of 1:5 with the redox active electrolyte to prepare a high-capacity slurry electrode.

Example 5

A high-capacity slurry electrode was prepared by mixing the spherical active carbon (AC8K30) of Example 1 with a redox active electrolyte containing the electrochemically active organic molecule 1,4-benzoquinone (BQ) in which an organic electrolyte was employed.

Briefly, the spherical active carbon AC8K30 as an electrode active material was mixed at weight ratio of 80 wt % to 20 wt % with the electroconducting agent carbon black and the mixture was ground in a mortar. Separately, 1 M TEABF$_4$ electrolyte salt was dissolved in propylene carbonate (PC) to give an organic electrolyte in which 0.3 M of the electrochemically active molecule 1,4-benzoquinone was then dissolved to prepare a redox active electrolyte. The mixture powder of the electrode active material and the electroconducting agent was blended at a weight ratio of 1:7 with the redox active electrolyte to prepare a high-capacity slurry electrode.

In this Example, the electrochemically active organic molecule 1,4-benzoquinone was dissolved in an organic electrolyte to give a redox active electrolyte. Compared to an aqueous electrolyte, the organic electrolyte can dissolve a greater amount of organic molecules because of higher solubility. For example, the organic electrolyte of Example 5 can dissolve up to 3 M of 1,4-benzoquinone. The organic molecules 1,4-benzoquinone and 1,4-benzenediol can be dissolved at a concentration of up to 5 M in a certain organic electrolyte. As such, an organic solvent can be used to increase the concentration of organic redox active materials, further improving the performance of the slurry electrode.

Example 6

A high-capacity slurry electrode was prepared by mixing the spherical active carbon (AC8K30) of Example 1 with an ionic liquid electrolyte. Briefly, the spherical active carbon AC8K30 as an electrode active material was mixed at weight ratio of 80 wt % to 20 wt % with the electroconducting agent carbon black and the mixture was ground in a mortar. Subsequently, the mixture powder of the electrode active material and the electroconducting agent was blended at a weight ratio of 1:9 with the ionic liquid EMITFSI electrolyte to prepare a high-capacity slurry electrode.

Example 7

A high-capacity slurry electrode was prepared by mixing the spherical active carbon (AC8K30) of Example 1 with an ionic liquid electrolyte. Briefly, the spherical active carbon AC8K30 as an electrode active material was mixed at weight ratio of 80 wt % to 20 wt % with the electroconducting agent carbon black and the mixture was ground in a mortar. Separately, EMITFSI ionic liquid electrolyte (80 wt %) was mixed with an acetonitrile (ACN) organic solvent (20 wt %) to give an electrolyte. The mixture powder of the electrode active material and the electroconducting agent was blended at a weight ratio of 1:8 with the electrolyte to prepare a high-capacity slurry electrode.

Comparative Example 1

A slurry electrode was prepared in the same manner as in one of Examples 1 to 3, with the exception that only the spherical active carbon AC8K30 and the electroconducting agent carbon black were used, without the electrochemically active organic or inorganic molecules.

Comparative Example 2

A slurry electrode was prepared by blending the anisotrophic active carbon MSP20 of Example 4 with a 1 M H$_2$SO$_4$ electrolyte at a weight ratio of 1:5.

Comparative Example 3

A slurry electrode was prepared by blending the graphene nanopowder of Example 4 with a 1 M H$_2$SO$_4$ electrolyte at a weight ratio of 1:6.

Comparative Example 4

A slurry electrode was prepared by blending a mixture powder of 60 wt %:40 wt % of the anisotropic active carbon MSP20:graphene nanopowder of Example 4 with a 1 M H$_2$SO$_4$ electrolyte at a weight ratio of 1:7.

Fabrication of Flow Energy Storage System

For use in evaluating electrochemical properties of the high-capacity slurry electrodes of the present invention, flow energy storage systems were fabricated with the slurry electrodes prepared in Examples and Comparative Examples.

Figure 5:
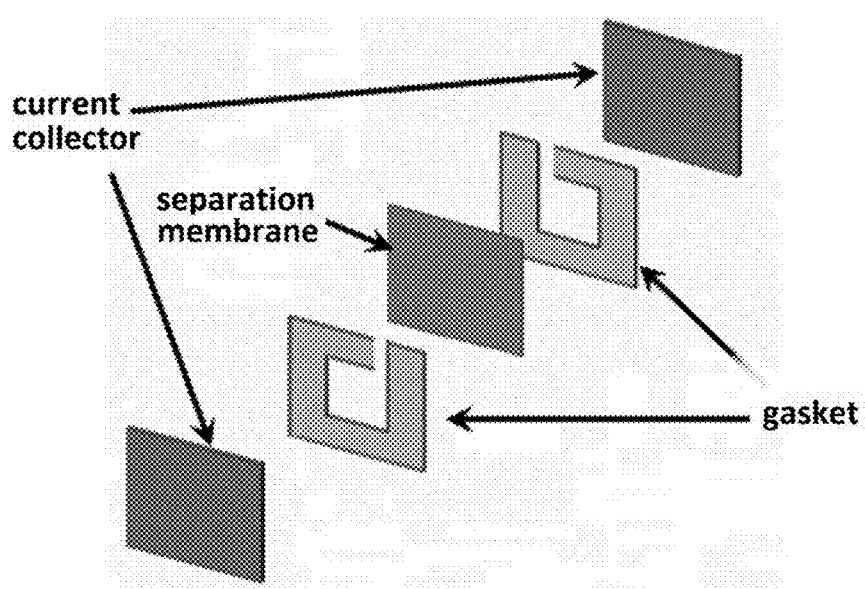
FIG. 5 is a schematic view showing the organization of a unit cell of a flow energy storage system.

FIG. 5 is a schematic view showing the organization of a unit cell of a flow energy storage system.

As each of anode and cathode current collectors, a graphite plate 3 mm thick was used, with an ion permeable separation membrane insulatingly intercalated therebetween. Between the opposite current collectors and the separation membrane was inserted respective gaskets, each having a space for accommodating a slurry electrode. For the gasket, a 1-mm thick silicon rubber with a groove about 4 cm$^2$ in area was adopted. The gasket had an inlet through which the slurry electrode could be introduced into the gasket.

For use in evaluating electrochemical properties of the slurry electrodes, the flow energy storage system fabricated in this Example was a two-electrode unit cell lacking storage and transport means of the slurry electrodes. In addition, the gasket was provided with an inlet, but not with an outlet. For a practically used flow energy storage system, an outlet for circulating a slurry electrode is provided. Further, a material for the gasket is preferably selected depending on properties of the electrolyte. Particular selection may be made of a material having high durability and chemical resistance, such as fluororubber, butyl rubber, Teflon, neoprene, latex, chlorosulfonated polyethylene rubber, ethylene propylene rubber, styrenebutadiene rubber, butadiene rubber, and nitrile butadiene rubber.

Evaluation of Electrochemical Properties

Slurry electrodes of the Examples and Comparative Examples were applied to two-electrode unit cells described above, and subjected to cyclic voltammetry.

Figure 6:
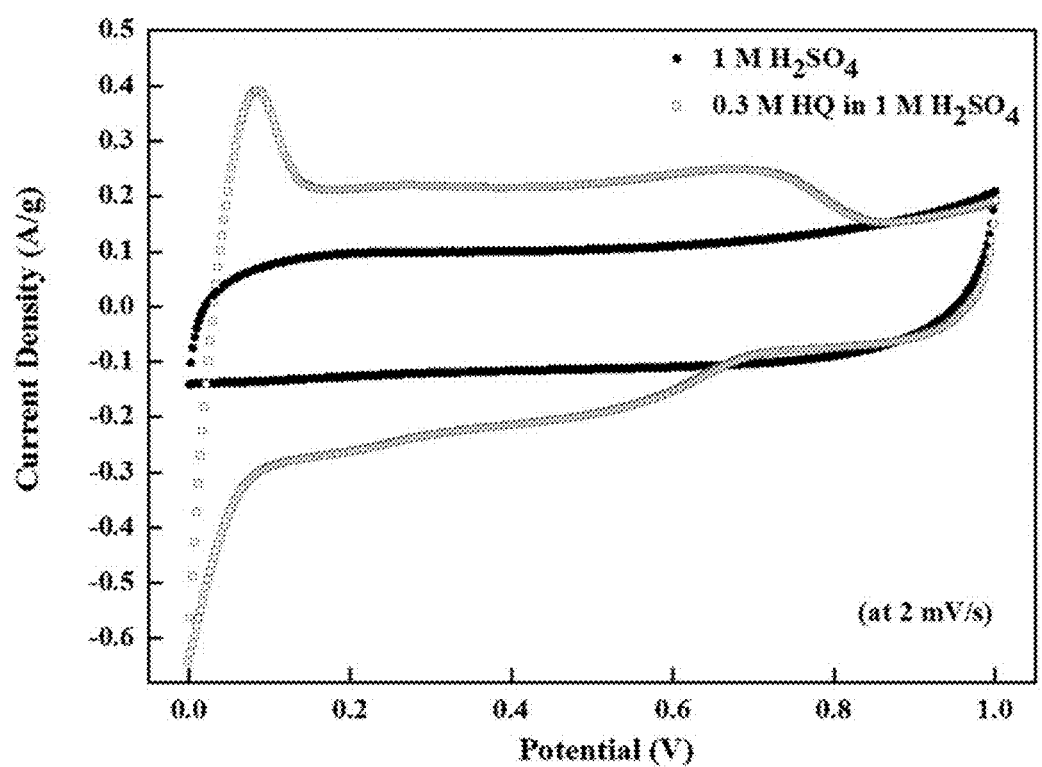
FIG. 6 is a cyclic voltammogram of the high-capacity slurry electrode of Example 1.

FIG. 6 is a cyclic voltammogram of the high-capacity slurry electrode of Example 1.

When experimented at a scan rate of 2 mV/s, the high-capacity slurry electrode of Example 1 was found to have a specific capacitance of 412.4 F/g, which is about twice as high as that of the general slurry electrode of Comparative Example 1 (220.1 F/g).

Figure 7:
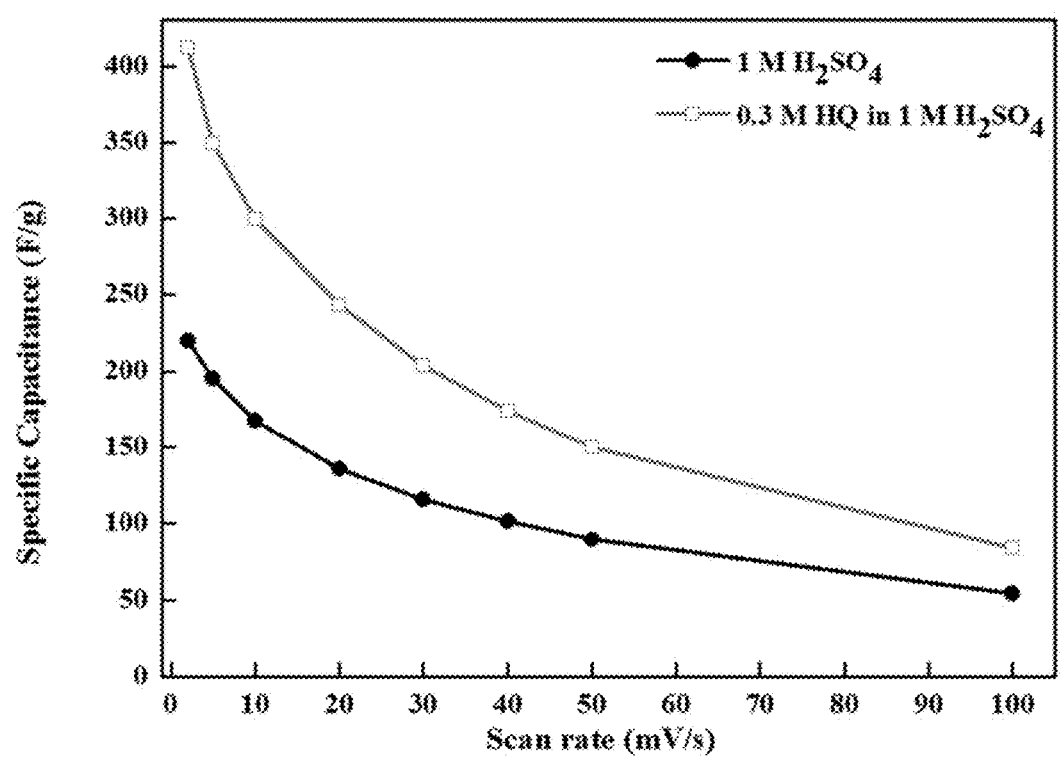
FIG. 7 is a graph showing specific capacitances of the high-capacity slurry electrode of Example 1 vs. scan rate, as measured by cyclic voltammetry.

FIG. 7 is a graph showing specific capacitances of the high-capacity slurry electrode of Example 1 vs. scan rate, as measured by cyclic voltammetry.

The specific capacitances of the high-capacity slurry electrode of Example 1 according to scan rates were measured as follows: 412.4 F/g at a scan rate of 2 mV/s, 349.2 F/g at a scan rate of 5 mV/s, 299.6 F/g at a scan rate of 10 mV/s, 243.3 F/g at a scan rate of 20 mV/s, and 150.2 F/g at a scan rate of 50 mV/s.

On the other hand, the slurry electrode of Comparative Example 1 was measured to have a specific capacitance of 220.1 F/g at a scan rate of 2 mV/s, 195.1 F/g at a scan rate of 5 mV/s, 167.6 F/g at a scan rate of 10 mV/s, 135.7 F/g at a scan rate of 20 mV/s, and 89.5 F/g at a scan rate of 50 mV/s.

From the data, it is apparent that the high-capacity slurry electrode of Example 1 exhibits higher specific capacitance over all the scan rates than does the slurry electrode of Comparative Example 1.

Figure 8:
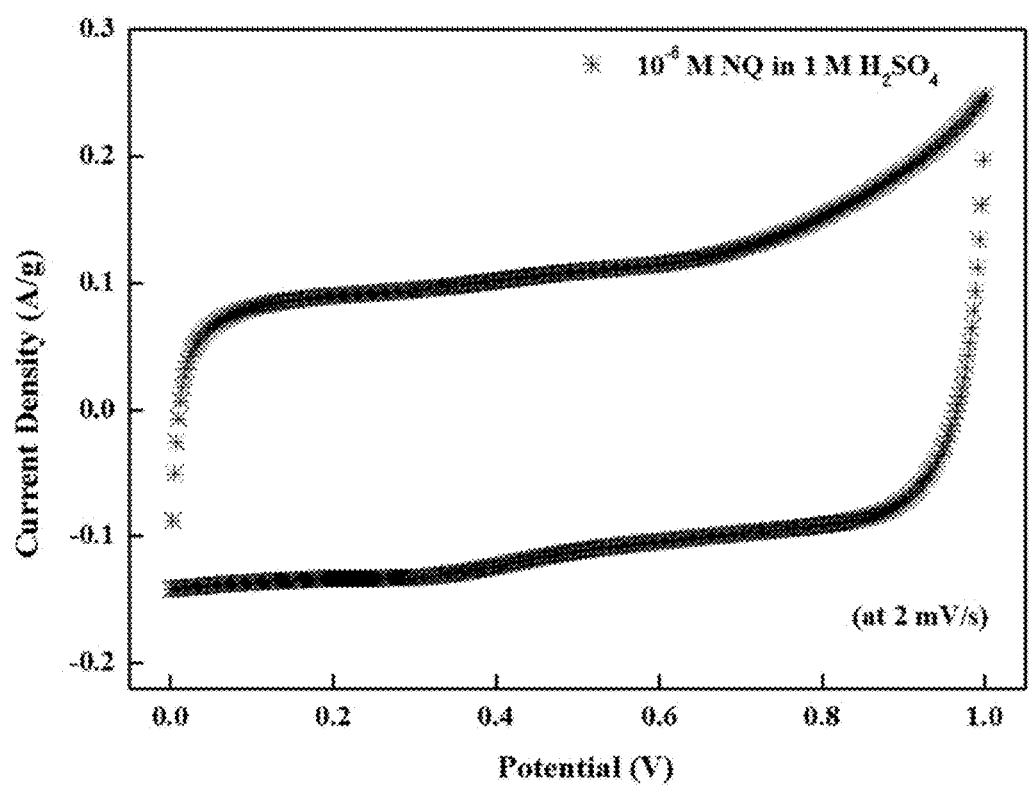
FIG. 8 is a cyclic voltammogram of the high-capacity slurry electrode of Example 2.

FIG. 8 is a cyclic voltammogram of the high-capacity slurry electrode of Example 2.

When experimented at a scan rate of 2 mV/s, the high-capacity slurry electrode was found to have a specific capacitance of 237.8 F/g, which is higher by about 10% than that of the general slurry electrode of Comparative Example 1 (220.1 F/g).

Figure 9:
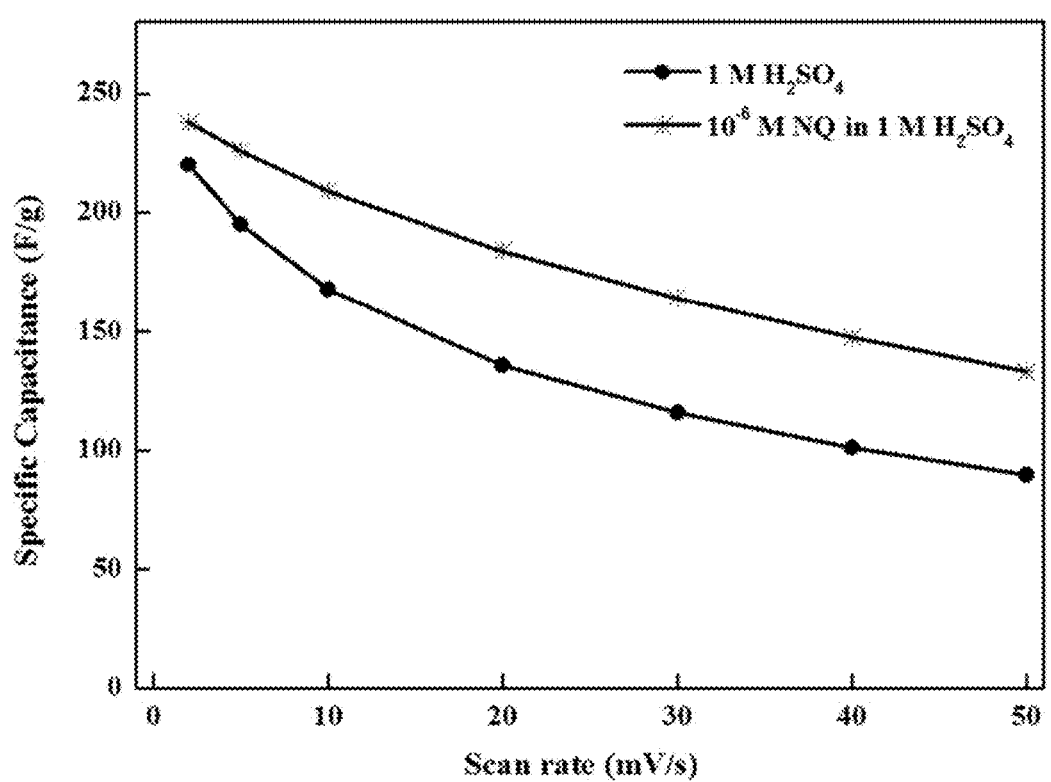
FIG. 9 is a graph showing specific capacitances of the high-capacity slurry electrode of Example 2 as a function of scan rate, as measured by cyclic voltammetry.

FIG. 9 is a graph showing specific capacitances of the high-capacity slurry electrode of Example 2 as a function of scan rate, as measured by cyclic voltammetry.

The specific capacitances of the high-capacity slurry electrode of Example 2 according to scan rates were measured as follows: 237.8 F/g at a scan rate of 2 mV/s, 225.8 F/g at a scan rate of 5 mV/s, 209 F/g at a scan rate of 10 mV/s, 183.7 F/g at a scan rate of 20 mV/s, and 132.9 F/g at a scan rate of 50 mV/s.

From the data, it is apparent that the high-capacity slurry electrode of Example 2 exhibits higher specific capacitance over all the scan rates than does the slurry electrode of Comparative Example 1. Particularly at a relatively high scan rate of 50 mV/s, the high-capacity slurry electrode of Example 2 was improved in specific capacitance by about 40%, compared to that of the slurry electrode of Comparative Example 1 (89.5 F/g).

The inferiority of the high-capacity slurry electrode of Example 2 in specific capacitance to that of Example 1 might be attributed partly to the very low concentration of $10^{-6}$ M of 1,4-naphtoquinone used. However, an increase in the capacitance of the slurry electrode in spite of such a small amount of 1,4-naphthoquinone demonstrates the effect of the present invention.

Figure 10:
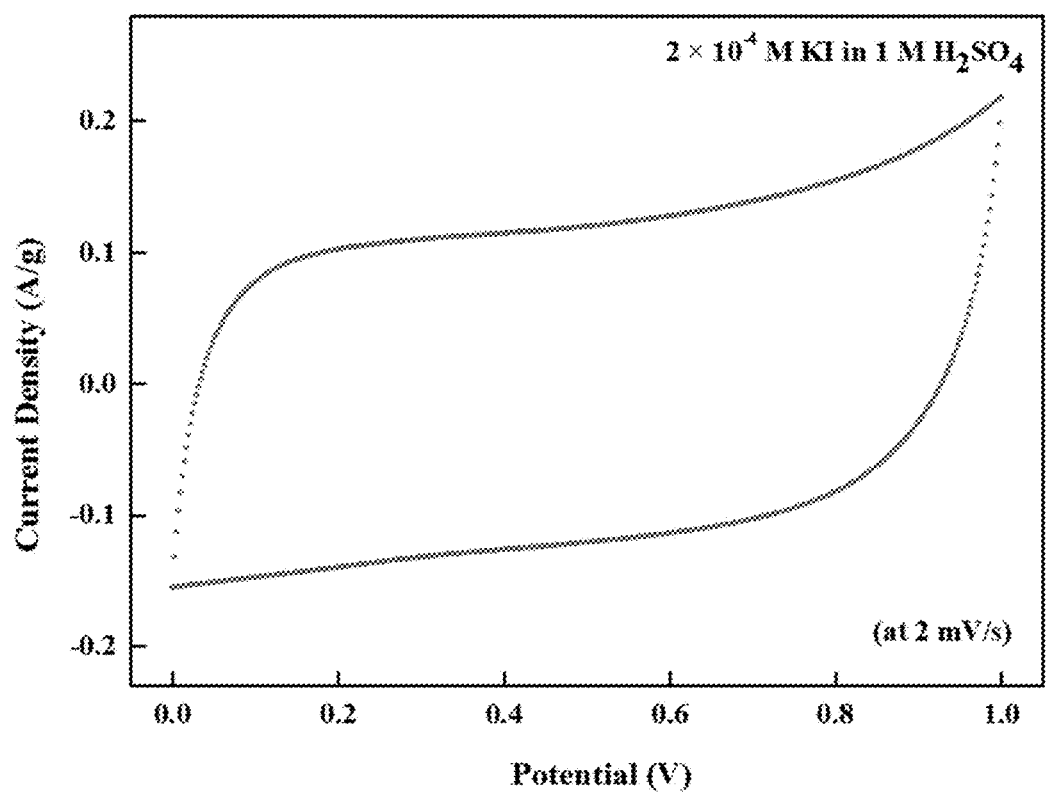
FIG. 10 is a cyclic voltammogram of the high-capacity slurry electrode of Example 3.

FIG. 10 is a cyclic voltammogram of the high-capacity slurry electrode of Example 3.

When experimented at a scan rate of 2 mV/s, the high-capacity slurry electrode of Example 3 was found to have a specific capacitance of 243.2 F/g higher by about 10% than that of the general slurry electrode of Comparative Example 1 (220.1 F/g).

Like that of Example 2, the high-capacity slurry electrode of Example 3 improved in performance, compared to the conventional slurry electrode, even though the electrochemically active material KI was used at such a low concentration of $2 \times 10^{-4}$ M.

Figure 11:
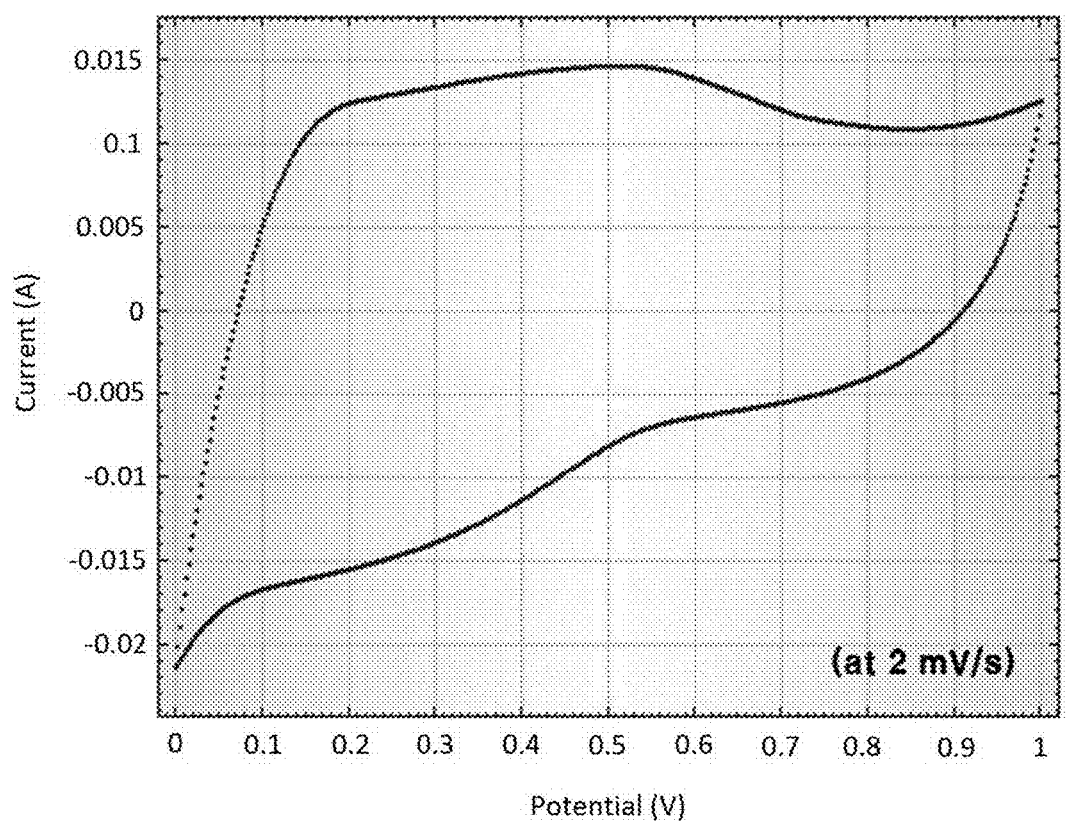
FIG. 11 is a cyclic voltammogram of the slurry electrode of Example 4.
Figure 12:
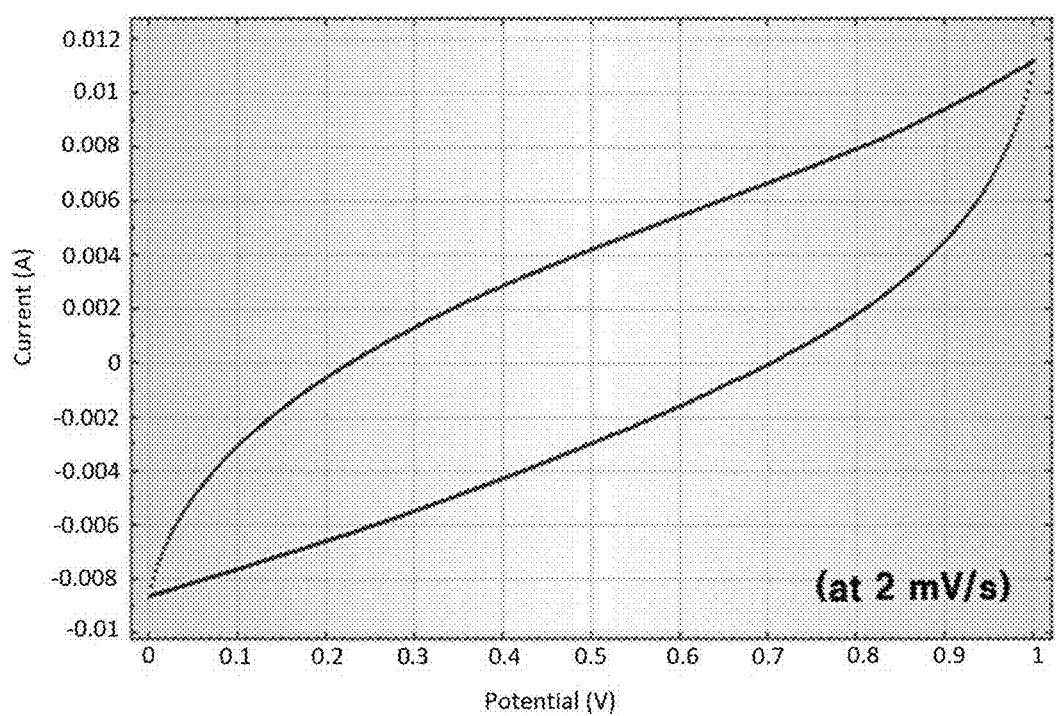
FIG. 12 is a cyclic voltammogram of the slurry electrode of Comparative Example 2.
Figure 13:
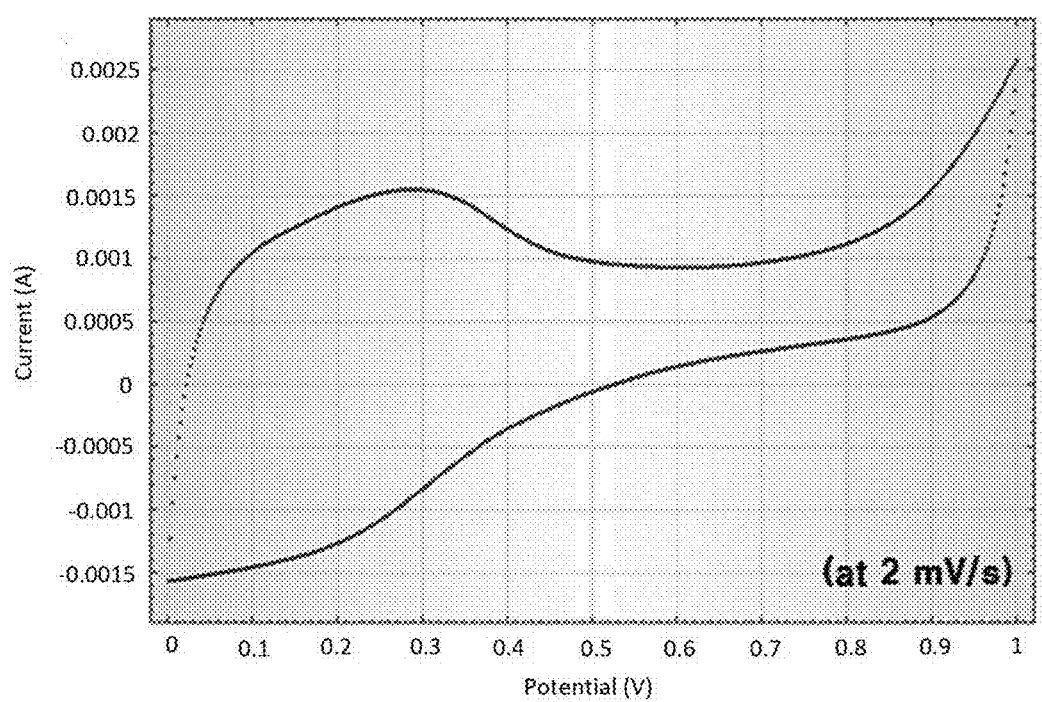
FIG. 13 is a cyclic voltammogram of the slurry electrode of Comparative Example 3.

FIGS. 11 to 13 are cyclic voltammograms of the slurry electrodes of Example 4 and Comparative Examples 2 and 3, respectively.

Figure 14:
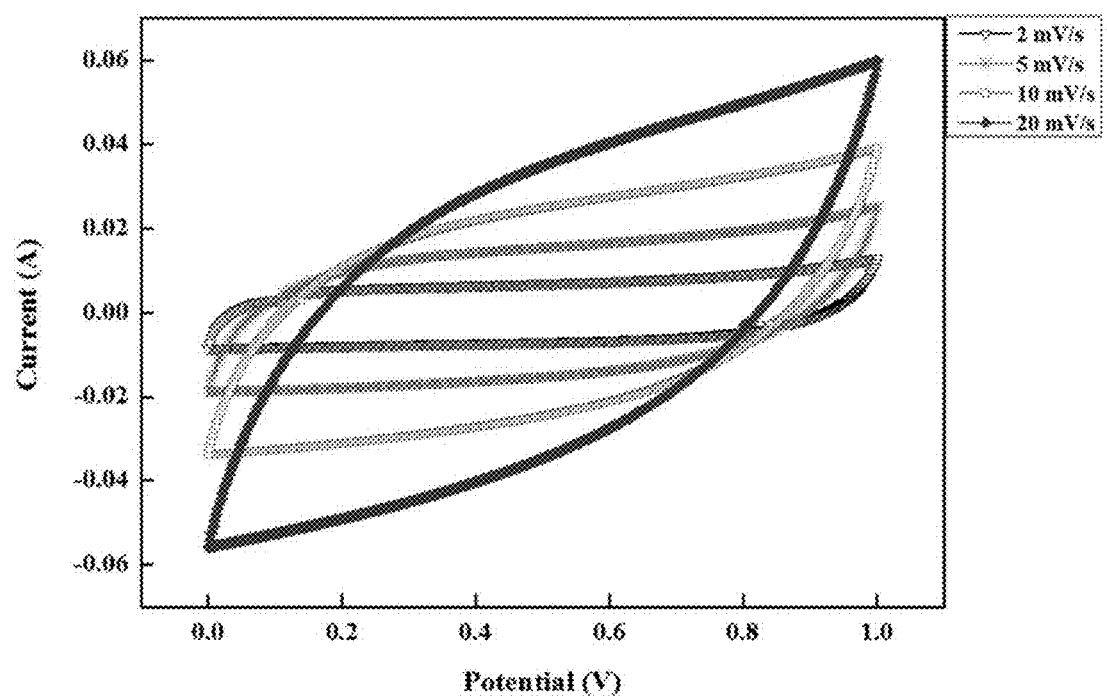
FIG. 14 shows cyclic voltammograms of the slurry electrode of Comparative Example 4 according to scan rate.
Figure 15:
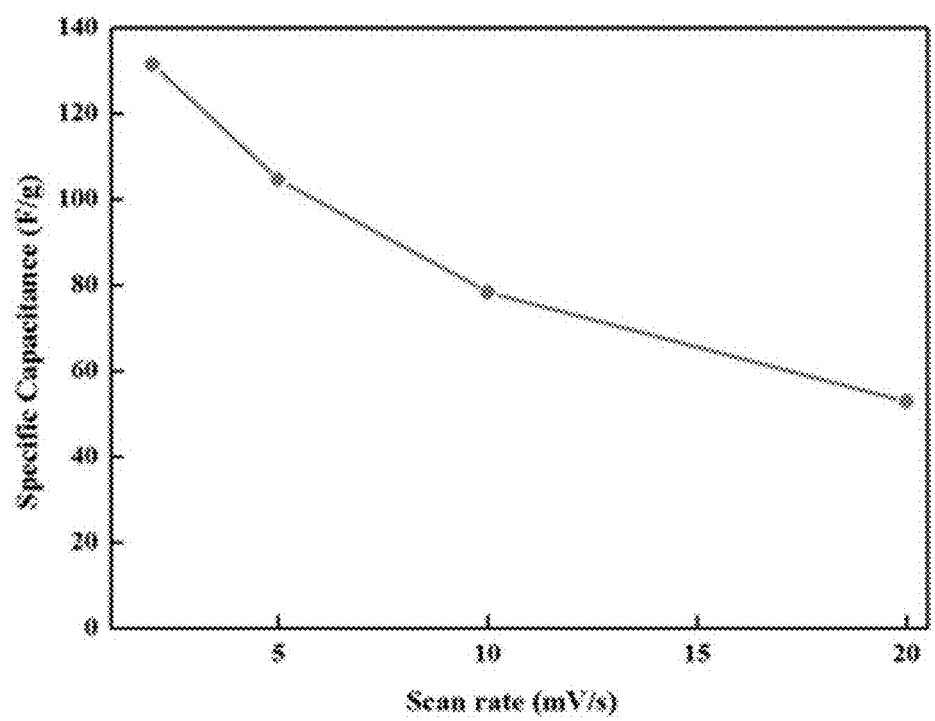
FIG. 15 is a graph showing specific capacitances as a function of scan rate, as measured by cyclic voltammetry.

FIG. 14 shows cyclic voltammograms of the slurry electrode of Comparative Example 4 according to scan rate, and FIG. 15 is a graph showing specific capacitances as a function of scan rate, as measured by cyclic voltammetry.

At a scan rate of 2 mV/s, the high-capacity slurry electrode of Example 4 was found to have a specific capacitance of 161.2 F/g, which was high than 48.2 F/g, 24.5 F/g, and 131.5 F/g of Comparative Examples 2 to 4, respectively, under the same condition, as measured by cyclic voltammetry. Compared to that of the slurry electrode of Comparative Example 4, the specific capacitance of the high-capacity slurry electrode of Example 4 was improved by about 20%.

Figure 16:
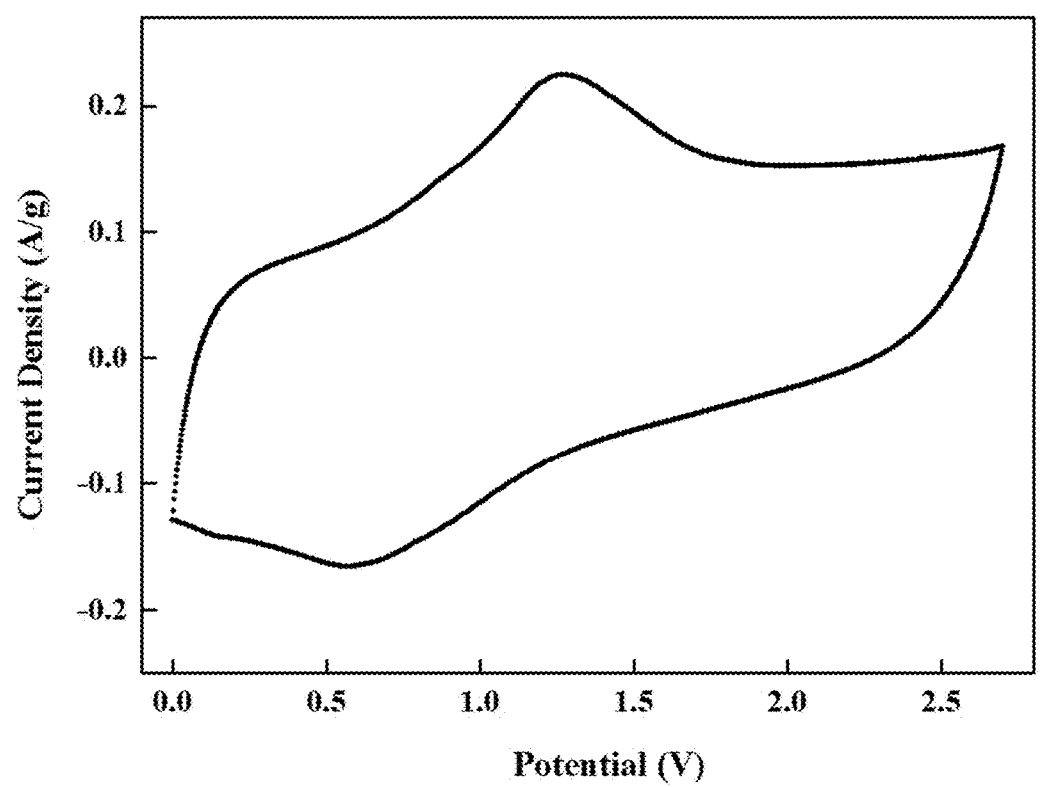
FIG. 16 is a cyclic voltammogram of the high-capacity slurry electrode of Example 5.

FIG. 16 is a cyclic voltammogram of the high-capacity slurry electrode of Example 5.

When experimented at a scan rate of 2 mV/s, the high-capacity slurry electrode of Example 5 was found to have a specific capacitance of 281.0 F/g, which is higher by about 27% than that of the general slurry electrode of Comparative Example 1 (220.1 F/g) based on an aqueous electrolyte. In addition, the operation voltage was measured to be 1 V for the conventional aqueous electrolyte-based slurry electrode, and increased by 2.7 times, that is, 2.7 V for the organic electrolyte-based slurry electrode. The maximum energy that can be charged in a capacitor is proportional to capacitance and a square of maximum operation voltage, as represented by the equation E (Energy)=$\frac{1}{2} \times C \times V^2$ (C=Capacitance, V=Voltage). Accordingly, it is very important to increase the maximum operation voltage as well as the capacitance. The high-capacity slurry electrode of Example 5 proved that it is possible to provide a high-energy density, high-capacity slurry electrode improved in operation voltage as well as capacitance.

Figure 17:
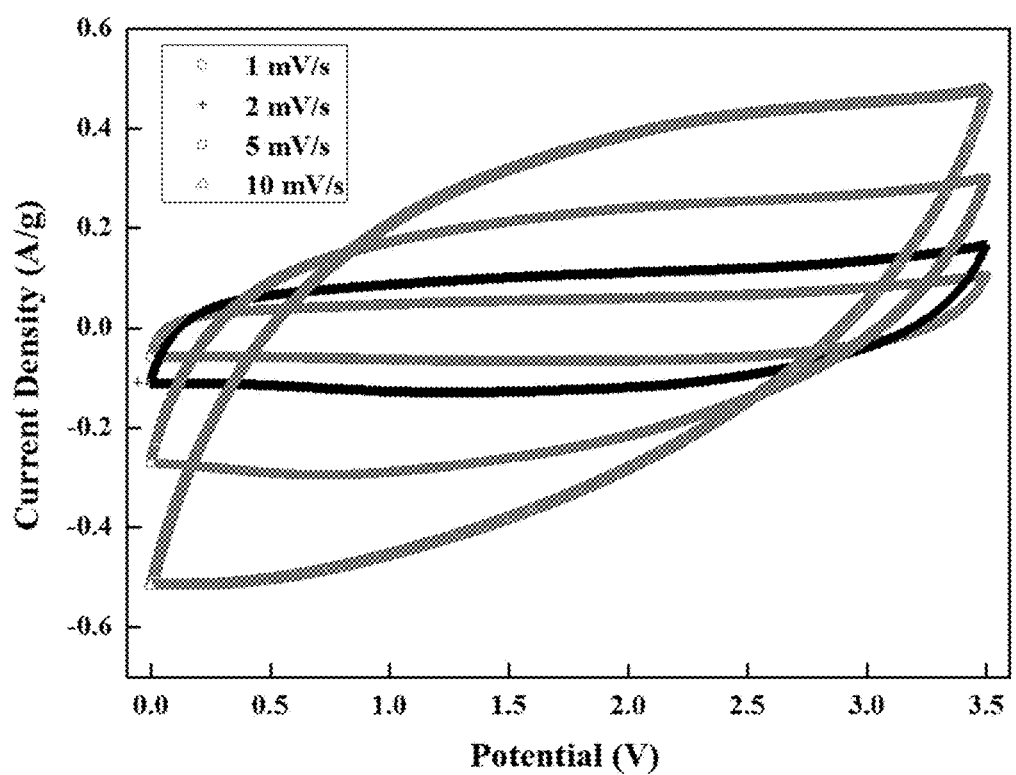
FIG. 17 shows cyclic voltammograms of the high-capacity slurry electrode of Example 6.
Figure 18:
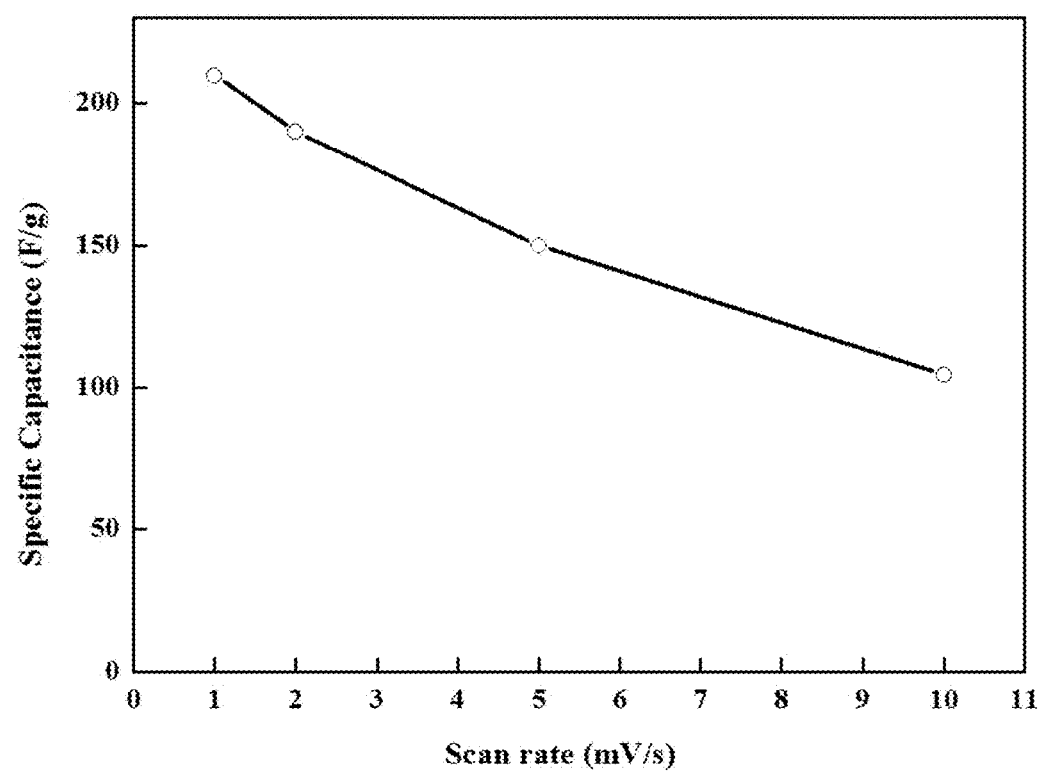
FIG. 18 is a graph showing specific capacitances of the high-capacity slurry electrode of Example 6 as a function of scan rate, as measured by cyclic voltammetry.

FIG. 17 shows cyclic voltammograms of the high-capacity slurry electrode of Example 6, and FIG. 18 is a graph showing specific capacitances of the high-capacity slurry electrode of Example 6 as a function of scan rate, as measured by cyclic voltammetry.

The specific capacitances of the high-capacity slurry electrode of Example 6 were measured by scan rate: 209.8 F/g at a scan rate of 1 mV/s, 190.1 F/g at a scan rate of 2 mV/s, 149.9 F/g at a scan rate of 5 mV/s, and 104.6 F/g at a scan rate of 10 mV/s. The operation voltage was found to be 0-3.5 V as measured by CV. The conventional aqueous electrolyte-based slurry electrode and the organic electrolyte-based slurry electrode had operation voltages of 1 V and 2.7 V, respectively whereas the operation voltage of the ionic electrolyte-based slurry electrode was expanded to 3 V. In addition, ionic liquid is a promising electrolyte in the energy storage field because it is superior in terms of non-volatility, non-explosiveness, and thermal and chemical stability as well as having a wide operation potential window. The maximum energy that can be charged in a capacitor is proportional to capacitance and a square of maximum operation voltage, as represented by the equation E (Energy)=$\frac{1}{2} \times C \times V^2$ (C=Capacitance, V=Voltage). Accordingly, it is very important to increase the maximum operation voltage as well as the capacitance. Having a wide operation voltage, the ionic liquid-based, high-capacity slurry electrode of Example 6 is expected to achieve a high energy density.

Figure 19:
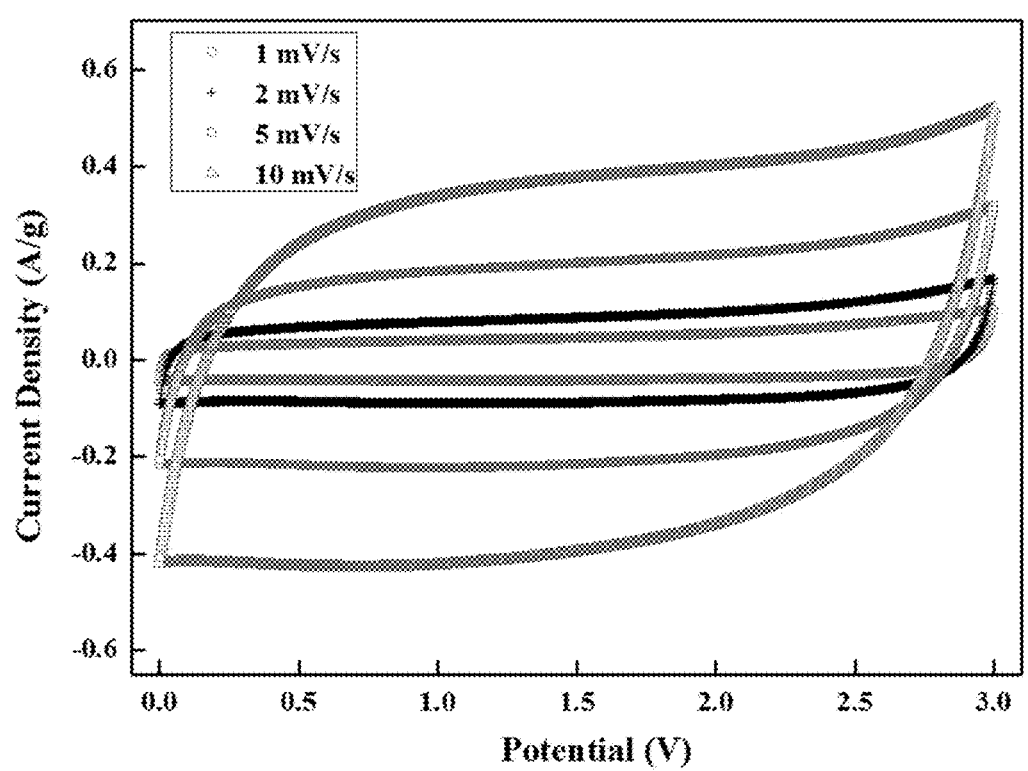
FIG. 19 shows cyclic voltammograms of the high-capacity slurry electrode of Example 7.
Figure 20:
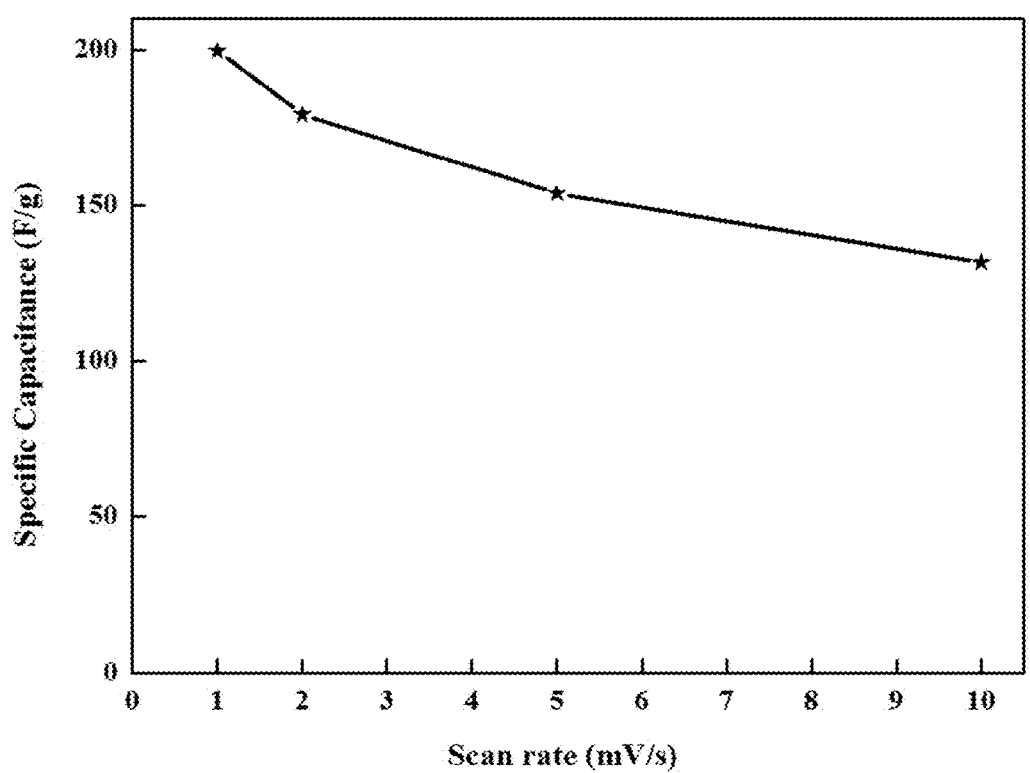
FIG. 20 is a graph showing specific capacitances of the high-capacity slurry electrode of Example 7 as a function of scan rate, as measured by cyclic voltammetry.

FIG. 19 shows cyclic voltammograms of the high-capacity slurry electrode of Example 7, and FIG. 20 is a graph showing specific capacitances of the high-capacity slurry electrode of Example 7 as a function of scan rate, as measured by cyclic voltammetry.

The specific capacitances of the high-capacity slurry electrode of Example 7 were measured by scan rate: 199.7 F/g at a scan rate of 1 mV/s, 179.4 F/g at a scan rate of 2 mV/s, 153.9 F/g at a scan rate of 5 mV/s, and 131.8 F/g at a scan rate of 10 mV/s. The operation voltage was found to be 0-3 V, as measured by CV.

As described in this Example, a mixed electrolyte of an ionic electrolyte and an organic solvent, by adjusting viscosity and ion conductivity of the electrolyte, can be useful for preparing a high-capacity slurry electrode.

Prepared from a mixture of electrode active particles functioning as an active material of an electrochemical flow capacitor storage system, and a redox active material responsible for redox reactions in electrochemical performance, as described hitherto, the high-capacity slurry electrode of the present invention is provided with pseudo-capacitor properties, and thus significantly improved in capacitance, compared to conventional slurry electrodes.

In addition, the flow energy storage system based on the high-capacity slurry electrode having a significantly improved capacitance according to the present invention is different from conventional electrochemical flow capacitor storage system because the slurry electrode also shows pseudocapacitor properties, and retains both the high capacitance of secondary cells and the advantages of electrochemical flow capacitor storage systems.

As for the slurry electrode of Example 4 in which anisotropic electrode active particles were employed, its capacitance was smaller than those of the slurry electrodes of Examples 1 to 3 wherein isotropic electrode active particles were employed. Since the slurry electrode of the present invention is in a semi-solid state, electric contacts between the current collector and the electrode and between the electrode active materials themselves are very important. In addition, since an electrode active region is not localized, but covers the entire surface of the electrode active material, a larger specific area of the electrode active material leads to a higher capacitance.

Descriptions of high-capacity slurry electrode-based flow energy storage systems in accordance with other embodiments of the present invention are omitted because the same organization as in electrochemical flow capacitor storage systems are applicable to the flow energy storage systems with the exception that the high-capacity slurry electrode is used as a fluid anode or cathode.

As described above, the slurry electrode is greatly improved in energy storage capacity because it employs an electrode active material, provided with pseudocapacitor properties, on a high-capacitance capacitor.

In addition, the flow energy storage system comprising the slurry electrode retains both the advantages of super capacitors, such as high charge/discharge rates, peak power acceptance, stability, longevity, etc., and the advantages of secondary cells, such as a high energy density.

Characterized by high output, high stability, and high energy density, the high-capacity slurry electrode-based flow energy storage system of the present invention is suitable for implementing smart grids.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A high-capacity slurry electrode for use in a flow energy storage system, comprising:
    an electrolyte;
    electrode active particles, distributed in the electrolyte, functioning as an electrode active material in an electrochemical flow capacitor storage system; and
    a redox active material, dissolved in the electrolyte, behaving as a pseudo-capacitor through a redox reaction on a surface of the electrode active material,
    wherein the redox active material is a reduced form, an oxidized form, or a derived form of an electrochemically active organic molecule based on a naphthalene or anthracene compound having either or both of an alcohol and an amine group, and
    wherein the high-capacity slurry electrode exhibits both capacitor properties based on the electrode active particles and pseudo-capacitor properties based on the redox active material.

2. The high-capacity slurry electrode of claim 1, wherein the electrode active particles are made of a material selected from among active carbon, graphene, a carbon nanotube, a conductive polymer, a metal oxide, and a combination thereof.

3. The high-capacity slurry electrode of claim 2, wherein the electrode active particles are spherical or symmetric with a specific surface area of 1000~4000 m$^2$/g.

4. The high-capacity slurry electrode of claim 3, wherein the electrode active particles have a particle size of 500 nm~500 μm.

5. The high-capacity slurry electrode of claim 1, wherein the redox active material is dissolved at a concentration of $10^{-9}$ M~10 M in the electrolyte.

6. The high-capacity slurry electrode of claim 1, wherein the redox active material is 1,4-naphthoquinone and is dissolved at a concentration of $10^{-9}$ M~5 M in the electrolyte.

7. The high-capacity slurry electrode of claim 1, further comprising conductive agent particles dispersed in the electrolyte, the conductive agent particles being used in an amount of 50 wt % or less of the electrode active particles.

8. The high-capacity slurry electrode of claim 7, wherein the conductive agent particles are carbon black.

9. A method for preparing a high-capacity slurry electrode comprising:
    dissolving a redox active material in an electrolyte to give a redox active electrolyte, the redox active material being electrochemically active so as to perform a redox reaction; and
    mixing electrode active particles with the redox active electrolyte, the electrode active particles functioning as an active material in an electrochemical flow capacitor storage system,
    wherein the redox active material is a reduced form, an oxidized form, or a derived form of an electrochemically active organic molecule based on a naphthalene or anthracene compound having either or both of an alcohol and an amine group.

10. The method of claim 9, wherein the electrolyte is an aqueous electrolyte containing at least one selected from among sulfuric acid ($H_2SO_4$), sodium sulfate ($Na_2SO_4$), potassium chloride (KCl), potassium hydroxide (KOH), and sodium hydroxide (NaOH).

11. The method of claim 9, wherein the electrolyte is a mixture of an organic solvent selected from the group consisting of acetonitrile (ACN), propylene carbonate (PC), ethylene carbonate (EC), diethylene carbonate (DEC), dimethylene carbonate (DMC), and a combination thereof, and a salt selected from among an ammonium salt, a lithium salt, and a combination thereof.

12. The method of claim 9, wherein the electrode active particles are blended with conducting agent particles to give a mixture powder, and the mixture powder is mixed at a weight ratio of 1:1~1:20 with the redox active electrolyte.

13. A high-capacity slurry electrode-based flow energy storage system, comprising:
- an anode current collector and a cathode current collector, separated from each other;
- an ion permeable separation membrane disposed between the anode current collector and the cathode current collector;
- a fluid anode positioned at an electrode region between the anode current collector and the ion permeable separation membrane; and
- a fluid cathode positioned at an electrode region between the cathode current collector and the ion permeable separation membrane,
- wherein at least one of the anode and the cathode is a high-capacity slurry electrode,
- the high-capacity slurry electrode comprising:
  - an electrolyte;
  - electrode active particles, distributed in the electrolyte, functioning as an electrode active material in an electrochemical flow capacitor storage system; and
  - a redox active material, dissolved in the electrolyte, behaving as a pseudo-capacitor through a redox reaction on a surface of the electrode active material, wherein the redox active material is a reduced form, an oxidized form, or a derived form of an electrochemically active organic molecule based on a naphthalene or anthracene compound having either or both of an alcohol and an amine group, and
  - wherein the high-capacity slurry electrode exhibits both capacitor properties based on the electrode active particles and pseudo-capacitor properties based on the redox active material.

14. The high-capacity slurry electrode-based flow energy storage system of claim 13, further comprising:
- storage tanks for storing the fluid anode and the fluid cathode, respectively;
- a path through which the fluid anode and the fluid cathode are circulated between the respective storage tanks and the electrode region; and
- a pump for driving the circulation.

15. The high-capacity slurry electrode-based flow energy storage system of claim 13, further comprising a gasket, positioned between the anode current collector or the cathode current collector and the ion permeable separation membrane, for forming the electrode region.

16. The high-capacity slurry electrode-based flow energy storage system of claim 15, wherein the gasket is made of a material selected from among silicon rubber, fluororubber, butyl rubber, polytetrafluoroethylene, neoprene, latex, chlorosulfonated polyethylene rubber, ethylene propylene rubber, styrenebutadiene rubber, butadiene rubber, and nitrile butadiene rubber.

* * * * *